US005757313A

United States Patent [19]

Meneghini et al.

[11] Patent Number: 5,757,313
[45] Date of Patent: May 26, 1998

[54] LACER-INDUCED TRANSFER PRINTING MEDIUM AND METHOD

[75] Inventors: Frank A. Meneghini, Keene, N.H.; John S. Deeken, Addison, N.Y.; John J. Drake, Keene, N.H.

[73] Assignee: Markem Corporation, Keene, N.H.

[21] Appl. No.: 568,253

[22] Filed: Dec. 6, 1995

Related U.S. Application Data

[63] Continuation-in-part of Ser. No. 565,417, Nov. 30, 1995, abandoned, which is a continuation of Ser. No. 149,285, Nov. 9, 1993, abandoned.

[51] Int. Cl.⁶ ............................................. B41J 2/47
[52] U.S. Cl. ............................... 347/262; 346/135.1
[58] Field of Search .......................... 347/95, 101, 262, 347/264; 346/135.1

[56] References Cited

U.S. PATENT DOCUMENTS

| | | | |
|---|---|---|---|
| 3,129,661 | 4/1964 | Newman. | |
| 3,740,671 | 6/1973 | Fechter | 346/135 |
| 3,833,441 | 9/1974 | Heiart. | |
| 3,959,799 | 5/1976 | Gambino et al. | 346/135 |
| 3,962,513 | 6/1976 | Eames | 428/323 |
| 3,964,389 | 6/1976 | Peterson | 101/467 |
| 3,975,563 | 8/1976 | Franer et al. | |
| 3,978,247 | 8/1976 | Braudy et al. | 427/43 |
| 4,245,003 | 1/1981 | Oransky et al. | |
| 4,541,830 | 9/1985 | Hotta et al. | 8/471 |
| 4,549,825 | 10/1985 | Sachdev et al. | 400/241.1 |
| 4,588,674 | 5/1986 | Stewart et al. | 430/273 |
| 4,626,493 | 12/1986 | Butters et al. | |
| 4,772,582 | 9/1988 | DeBoer | 503/227 |
| 4,788,128 | 11/1988 | Barlow | 430/200 |
| 4,914,078 | 4/1990 | Hann et al. | |
| 4,929,593 | 5/1990 | Tezuka et al. | 503/207 |
| 4,987,006 | 1/1991 | Williams et al. | 427/53.1 |
| 5,017,547 | 5/1991 | DeBoer | 503/227 |
| 5,019,549 | 5/1991 | Kellogg et al. | 503/227 |
| 5,064,743 | 11/1991 | Koshizuka et al. | |
| 5,089,372 | 2/1992 | Kirihata et al. | |
| 5,171,650 | 12/1992 | Ellis et al. | 530/20 |
| 5,178,996 | 1/1993 | Kobayashi et al. | 430/532 |
| 5,183,798 | 2/1993 | Sarraf et al. | 503/227 |
| 5,198,321 | 3/1993 | Hosoi et al. | 430/138 |
| 5,232,817 | 8/1993 | Kawakami et al. | |
| 5,238,778 | 8/1993 | Hirai et al. | |
| 5,395,729 | 3/1995 | Reardon et al. | 430/200 |
| 5,397,673 | 3/1995 | Watson et al. | 347/95 |
| 5,401,606 | 3/1995 | Reardon et al. | |

FOREIGN PATENT DOCUMENTS

| | | |
|---|---|---|
| 1050805 | 3/1979 | Canada. |
| 0 076 044 | 9/1982 | European Pat. Off.. |
| 0 160 396 | 3/1985 | European Pat. Off.. |
| 0 268 202 | 11/1987 | European Pat. Off.. |
| 0 318 945 | 11/1988 | European Pat. Off.. |
| 0 531 580 A1 | 9/1991 | European Pat. Off.. |
| 0 530 018 | 3/1993 | European Pat. Off.. |
| 2 258 265 | 8/1975 | France. |
| 2 264 671 | 10/1975 | France. |
| 37 15991 | 11/1987 | Germany. |
| 61-041 547 | 10/1986 | Japan. |
| 3-043 295 | 10/1991 | Japan. |
| 3-244588 | 10/1991 | Japan. |
| 2 083 726 | 3/1982 | United Kingdom. |
| WO 92/09441 | 6/1992 | WIPO. |

*Primary Examiner*—Mark J. Reinhart
*Attorney, Agent, or Firm*—Fish & Richardson P.C.

[57] ABSTRACT

A transfer printing medium that includes a carrier to which is applied a curable laser-transferrable ink having one or more layers. The transfer medium is capable of converting laser energy to heat. The ink includes: (a) at least one colorant; (b) at least one polymerization initiator; and (c) at least one curable prepolymer.

21 Claims, No Drawings

LACER-INDUCED TRANSFER PRINTING MEDIUM AND METHOD

This application is a continuation-in-part of U.S. Ser. No. 08/565,407, filed Nov. 30, 1995, now abandoned which is a continuation of application U.S. Ser. No. 08/149,285, filed Nov. 9, 1993, now abandoned.

BACKGROUND OF THE INVENTION

This invention relates to laser-induced transfer printing.

In laser-induced transfer printing, irradiation of an ink-bearing carrier with laser light causes the ink to transfer from the carrier to a surface, e.g., the surface of a microelectronic device, audio cassette, computer diskette, or syringe body. By manipulating the scanning parameters of the laser beam, the ink can be deposited in a programmed pattern.

SUMMARY OF THE INVENTION

In a first aspect, the invention features a transfer printing medium that includes a carrier to which is applied a curable laser-transferrable ink having one or more layers. The transfer medium is capable of converting laser energy to heat. The ink includes (a) at least one colorant; (b) at least one polymerization initiator; and (c) at least one curable prepolymer. By "colorant" it is meant any additive that imparts color to the ink, including the colors white and black. Colorants include both dyes and pigments, as well as metallized coatings. By "prepolymer" it is meant any species capable of being polymerized following either thermal or photochemical initiation to form a polymer.

In preferred embodiments, the ink transfers to a surface of interest and cures in one step upon application of laser energy. In one preferred embodiment, at least one of the polymerization initiators is a thermal polymerization initiator and at least one of the prepolymers is thermally curable. In another preferred embodiment, at least one of the polymerization initiators is a photoinitiator and at least one of the prepolymers is photochemically curable.

One example of a preferred prepolymer is an epoxy-functionalized prepolymer. A second example is an epoxy-functionalized prepolymer combined with a vinyl ether-functionalized prepolymer. A third example is an epoxy-functionalized prepolymer combined with an acrylate-functionalized prepolymer. A fourth example includes the acrylate-functionalized prepolymers themselves. A fifth example is a blocked isocyanate-functionalized prepolymer and a sixth example is a blend of a vinyl ether-functionalized prepolymer and a maleate- or maleimide-funtionalized prepolymer.

At least one of the ink layers may be a curable size coat that includes a polymerization initiator and a curable prepolymer. The size coat is used in combination with a color coat layer. In one preferred embodiment, the color coat is non-curable and includes a colorant and a thermoplastic film-forming resin. In another preferred embodiment, the color coat is curable and includes a colorant, a polymerization initiator, and a curable prepolymer. In the case of curable color coats used with curable size coats, the polymerization initiators and prepolymers found in the respective layers may be the same as, or different from, each other.

In a second aspect, the invention features a laser-induced transfer printing method using the above-described transfer printing medium. The method includes the steps of irradiating the particular transfer printing medium with laser light of a predetermined wavelength to transfer the ink from the carrier to a surface of interest, and curing the ink to adhere the ink to the surface of interest. The transfer and cure of the ink may be effected in a single step through irradiation with said laser light. Cure may also be effected in a separate step subsequent to transfer.

In another aspect, multiple ink transfers from different colored transfer media can occur before the cure step. A single cure step then can create a single multicolor (e.g., black and white, or brown and white) image.

The invention provides transfer printing media featuring curable inks that adhere well to the surface on which they are deposited following laser irradiation. The inks transfer cleanly from the supporting carrier and cure rapidly; in some cases, transfer and cure are effected in a single step. It is not necessary to add a separate self-oxidizing material such as nitrocellulose in order to effect transfer. In addition, the ability to use non-curable layers (e.g., non-curable color coats) in combination with curable layers (e.g., curable size coats) expands the types of materials that can be used for the inks, enabling the properties of the inks to be adjusted as needed for a particular application.

Other features and advantages of the invention will be apparent from the following description of the preferred embodiments thereof, and from the claims.

DESCRIPTION OF THE PREFERRED EMBODIMENTS

The invention features a transfer printing medium capable of converting laser energy to heat in which a curable laser-transferrable ink having one or more layers is deposited on a carrier. The carrier must have sufficiently low surface energy to permit transfer of the ink. It also must not melt or otherwise deform upon laser irradiation. Examples of suitable carriers include flexible plastic films such as polyethylene, polypropylene, and polyester.

The transfer medium is capable of converting laser energy to heat to promote transfer of the ink from the carrier to the surface of interest. To this end, one or more thermal convertors are incorporated into the carrier, the ink, or both. The thermal convertors may be separate additives or may be part of the prepolymer.

In the case of separately added convertors included in the ink, the amount of convertor ranges from about 0.25 to about 30% by weight (based upon the total solids content of the ink). The particular convertor is selected based upon the particular laser energy used for irradiation. In the case of $CO_2$ lasers, the preferred convertors are carbon black, polyethylene glycol (e.g., PEG 3000 commercially available from Union Carbide), talc (e.g., Nytal 400 commercially available from R. T. Vanderbilt), and PPZ, a phosphotriazine commercially available from Idemitsu Petrochemicals Co. Ltd; PPZ may also function as a prepolymer. In the case of Nd:YAG lasers, the preferred convertors are IR99, IRA 980, and IR165, all of which are proprietary dyes commercially available from Glendale Protective Technologies. IR dye 14,617 (a proprietary dye commercially available from Eastman Kodak), and Projet 900ONP (a proprietary dye commercially available from ICI). In the case of diode lasers, the preferred convertors are IR dye 14,617 and IRA 980.

The inks may have one or more layers, with particular ingredients (e.g., prepolymer, polymerization initiator, etc.) being present in any of the layers. One example of ink is a one layer ink (referred to here as a "one-pass" coating) having a curable color coat that includes, in a single layer, a curable prepolymer, a polymerization initiator, and a colorant. Another example is a two layer ink (referred to here as a "two-pass" coating) having a color coat (which may be curable or non-curable) in combination with an overlying curable size coat that includes a curable prepolymer and a polymerization initiator.

Because the inks are curable, adhesion upon transfer to a surface of interest is improved. The advantage of the size coat (which is transferred with the color coat upon laser irradiation) is that adhesion is further enhanced, thereby making it possible to use even a non-curable color coat.

The inks contain one or more curable prepolymers, with the total amount of curable prepolymer ranging from 25 to 95% by weight (based upon the total solids content of the ink). Curable prepolymers useful in the invention have two or more functional groups available for crosslinking (which occurs either simultaneously with transfer upon application of laser radiation or following laser irradiation in a separate thermal or photochemical cure step).

One class of suitable curable prepolymers includes epoxy-functionalized prepolymers such as bisphenol A diglycidyl ether (commercially available from Shell Oil under the designation Epon 1001) and epoxy-functionalized novolac resins (e.g., Epon 164 commercially available from Shell Oil). Lower molecular epoxides such as UVR6110 (a liquid diepoxide commercially available from Union Carbide) may be added as well.

A second class of suitable curable prepolymers includes these epoxy-functionalized prepolymers in combination with one or more vinyl ether-functionalized prepolymers which co-cure with the epoxy-functionalized prepolymers. Examples of suitable vinyl ether-functionlized prepolymers include bisphenol A-divinyl ether adduct; 2,4-toluene diisocyanate/hydroxybutyl vinyl ether adduct; cyclohexyl divinyl ether commercially available from GAF or ISI Products; vinyl ethyl ether, vinyl isobutyl ether, vinyl octadecyl ether, polyethylene glycol divinyl ether, polytetrahydrofuran/350/divinyl ether, and trimethylol propane trivinyl ether, all of which are commercially available from BASF; Rapi/cure divinyl ether/3, Rapi/cure cyclohexyl vinyl ether, Rapi/cure PEPC, and Rapi/cure hydroxy butyl vinyl ether, all of which are commercially available from ISP; and Vectomers 2010, 2031, 2032, 4010, 4020, and 4030, all of which are commercially available from Allied-Signal.

A third class of suitable curable prepolymers includes the above-described epoxy-functionalized prepolymers in combination with one or more acrylate-functionalized prepolymers. Examples of acrylate-functionalized prepolymers include RDX 29522 and Ebecryl 639 (both of which are commercially available from Radcure); Sartomer 351 (commercially available from Sartomer); and NR440 (commercially available from Zeneca Resins).

A fourth class of suitable curable prepolymers includes the acrylate-functionalized prepolymers themselves without the epoxy-functionalized prepolymers.

A fifth class of suitable curable prepolymers includes blocked isocyanate-functionalized prepolymers. Examples include B1299 (commercially available from Huls) and BL4165A (commercially available from Miles).

A sixth class of suitable curable prepolymers includes the above-described vinyl ether-functionalized prepolymers in combination with maleate- or maleimide-functionalized prepolymers. Examples of maleate-functionalized prepolymers include 89-8902 (commercially available from Cargil Products); and Astrocure 78HV and Astrocure 78LV (both of which are commercially available from Zircon). Examples of maleimide-functionalized prepolymers include BMI/S/M/20/TDA (commercially available from Mitsui Toatsu Chemical, Inc.).

One or more non-curable layers may be used in combination with one or more curable layers. For example, a non-curable color coat may be combined with an overlying curable size coat. Suitable non-curable resins are thermoplastic film-forming resins. Examples include acrylic resins such as Rhoplex B85 (an acrylic dispersion commercially available from Rohm & Haas) and Amsco 3011 (an acrylic dispersion available from Rohm & Haas); urethane resins such as QW-16 (a urethane dispersion useful as a film-former that is commercially available from K. J. Quinn); phenoxy resins such as PKHW 35 (commercially available from Union Carbide); and combinations thereof. The amount of non-curable prepolymer in the ink ranges from about 15 to about 35% by weight (based upon the total solids content of the ink).

The inks also contain a polymerization initiator in an amount ranging from about 0.1 to 5% by weight (based upon the total solids content of the ink). The initiator (which typically is a free radical or cationic initiator) may be a photochemical initiator or a thermal initiator; in some cases, the same initiator can act as both a thermal and a photochemical initiator. In the case of multi-layer inks containing multiple curable layers, layers containing photochemical initiators may be combined with layers containing thermal initiators. In addition, some initiators may be used in conjunction with accelerators such as benzpinacole, copper II salts (e.g., copper benzoate), and hexaphenylethane.

In the case of thermal initiators, the initiator must exhibit good stability at ambient temperature to prevent premature curing of the prepolymer. In addition, the initiation temperature must be within the range achievable by laser irradiation. Examples of suitable thermal initiators for cationic initiation include aryl sulfonium salts (e.g., the salts described in W090/11303, hereby incorporated by reference); aryl iodonium salts (e.g., UVE 9310 and U 479, both of which are commercially available from General Electric); and ammonium salts (e.g., FC520, commercially available from 3M). Examples of suitable thermal initiators for free radical initiation include the class of compounds leading to peroxy radicals, e.g., hydroperoxides, peroxyesters, and peroxyketals; representative compounds are commercially available from Elf-Atochem. Also suitable for free radical initiation are azo polymerization initiators commercially available from Wako.

In the case of photochemical initiators, the initiator must also exhibit good stability at ambient temperature to prevent premature curing of the prepolymer. In addition, it must exhibit absorption maxima in regions of the electromagnetic spectrum different from the regions in which the colorant exhibits absorption maxima. Examples of suitable photochemical initiators for cationic initiation include aryl sulfonium salts (e.g., UVI 6974 commercially available from Union Carbide) and aryl iodonium salts (e.g., UVE 9310 and U 479, both of which are commercially available from General Electric). Another example of a suitable initiator for cationic initiation is hydroxy naphthyl imide sulfonate ester. Examples of suitable photochemical initiators for free radical initiation include CPTX and ITX (both commercially available from Ciba-Geigy), each of which is combined with methyl diethanolamine (commercially available from Aldrich Chemical Co.; lucerin TPO (commercially available from BASF) combined with methyl diethanolamine; Darcure 4265 (commercially available from Ciba Geigy), and Irgacure 369 combined with ITX.

The ink contains one or more colorants, which may be dyes, pigments, or metallized coatings (e.g., an aluminized coating). In the case of dyes and pigments, the colorant is present in an amount ranging from about 35 to 85% by weight (based upon the total solids content of the ink). The particular colorant is chosen based upon the color desired on the final printed surface. Examples of suitable colorants include pigments such as talc, $TiO_2$ (white), phthalogreen (GT-674-D), chrome green oxide (6099), ultramarine blue (RS-9), black oxide (BK-5099D), Kroma red (7097), and Novaperm yellow (HR-70), and dyes such as dynonicidine (2915) and Dianell orange, as well as the aforementioned metallized coatings.

In the case of inks containing photocurable prepolymers, a sensitizer may be added in an amount ranging from about 0.5 to 8% by weight (based upon the total solids content of the ink) to extend the irradiating wavelength for photoinitiation into the visible region. Such sensitizers are useful, for example, where the formulation contains large amounts of $TiO_2$ pigment which absorbs light below 400 nm and thus competes with the initiator. Examples of suitable sensitizers, all of which are commercially available from Aldrich Chemical Co., include perylene, rubrene, phenothiazine, anthracene derivatives, and thioxanthones, as well as lucerin TPO (commercially available from BASF).

Other ingredients which may be added to the inks to improve the coatability, printability, print performance, and durability of the inks include various surfactants, dispersing agents, and polymer dispersions. The amount of each ingredient is selected based upon the desired properties. Examples of suitable surfactants (which may be anionic, cationic, or non-ionic) include Triton X-100 (an aryl ethoxylate commercially available from Rohm & Haas) and FC 430 (a fluoroaliphatic polymeric ester available from 3M). Examples of suitable dispersing agents include polyacrylate salts such as Daxad 30, a 30% aqueous solution of polysodiumacrylate commercially available from W. R. Grace. Examples of suitable dispersions include Shamrock 375 and Aquacer 355, both of which are polyethylene wax dispersions commercially available from Diamond Shamrock.

The transfer medium according to the invention is prepared by combining the ink ingredients in an aqueous or organic solvent (with aqueous solvents being preferred), and then applying the resulting composition to the carrier. If a size coat is used, it is applied on top of the color coat. To facilitate coating, the total solids content of the ink is adjusted to be between 10 and 50% by weight of the ink. The coated carrier is then irradiated with laser light (e.g., the method described in the commonly assigned Enge et al. application, U.S. Ser. No. 08/565,417, filed concurrently with this application which is a continuation-in-part of the commonly assigned Enge et al. application, U.S. Ser. No. 08/149,551, filed Nov. 9, 1993, both of which are hereby incorporated by reference) to transfer the ink from the carrier to a desired surface, e.g., the surface of a semiconductor device. Suitable lasers include $CO_2$ lasers (irradiation wavelength equals 10.6μm), Nd:YAG lasers (irradiation wavelength equals 1.06 μm), and diode lasers (irradiation wavelength equals, e.g., 0.9 μm). The particular irradiation wavelength, power, and time of application parameters are selected to ensure clean transfer.

In the case of some inks, laser irradiation both transfers and cures the ink simultaneously (e.g., as described in the commonly assigned enge et al. application, U.S. Ser. No. 08/565,417, filed concurrently with this application and incorporated by reference in the previous paragraph). With other inks, a separate thermal or photochemical cure is effected following transfer. The cure conditions are selected based upon the particular prepolymers and initiators used in the formulation.

The invention will now be further described by way of the following examples.

EXAMPLE 1

This example describes the preparation of a transfer medium having one-pass, thermally curable, cationically initiated, ink.

The following ingredients were combined to form a laser-transferrable ink (all amounts in weight percent):

| | |
|---|---|
| $TiO_2$ | 55.0 |
| Bisphenol A-DVE adduct | 13.0 |
| 35201[1] | 24.8 |
| PEG 3000[2] | 5.0 |
| Aryl sulfonium salt[3] | 2.0 |
| Triton X-100[4] | 0.2 |

[1] Aqueous dispersion of bisphenol A-epichlorohydrin adduct formerly available from Rhone-Poulenc.
[2] Polyethylene glycol ($M_n$ = 3000) commercially available from Union Carbide.
[3] Aryl sulfonium salt thermal initiator of the type described in WO90/11303.
[4] Surfactant commercially available from Rohm & Haas.

Water was added to adjust the total solids content to 35% by weight, after which the resulting ink was coated onto a 1.2 mil thick polypropylene carrier film using a #15 mayer rod. The coated surface of the film was then placed in intimate contact with the surface of a molded semiconductor device. Next, a $CO_2$ laser was directed through the uncoated side of the carrier film to transfer the ink to the surface of the semiconductor device. The laser dwelled on each addressed pixel for 16 μsec. The power output of the laser at the point of contact with the coated film was 14.5 W. The device bearing the transferred image was then placed in a forced hot air oven for 30 min. at 175° C. to cure the ink. After curing, the transferred image was found to be resistant to treatment with 1,1,1-trichlorethane (3 min. soak, 10 brush strokes, cycled 3 times).

EXAMPLE 2

This example describes the preparation of a transfer medium having a two-pass, cationically initiated ink in which both the color coat and the size coat are photochemically curable.

The following ingredients were combined to form a photochemically curable color coat (all amounts in weight percent):

| | |
|---|---|
| $TiO_2$ | 55.0 |
| 2,4-toluene diisocyanate/HBVE adduct[1] | 5.8 |
| QW-16 (urethane dispersion)[2] | 2.0 |
| PPZ[3] | 5.0 |
| Triton X-100[4] | 0.2 |
| UVI 6974[5] | 2.0 |

[1] Hydroxy butyl divinyl ether adduct.
[2] Pre-made urethane dispersion commercially available from K. J. Quinn.
[3] Commercially available from Idemitsu Petrochemicals Co. Ltd.
[4] Surfactant commercially available from Rohm & Haas.
[5] Triaryl sulfonium salt-based initiator commercially available from Union Carbide.

Water was added to adjust the total solids content to 35% by weight, after which the resulting color coat was applied to a 1.2 mil thick polypropylene carrier film using a #13 mayer rod.

The following ingredients were combined to form a photochemically curable size coat (all amounts in weight percent):

| EPON 1001[1] | 89.1 |
|---|---|
| UVI 6110[2] | 5.45 |
| FC-430[3] | 2.47 |
| UVI 6974[4] | 1.68 |
| Perylene[5] | 0.3 |
| PPZ[6] | 1.0 |

[1]Bisphenol A diglycidyl ether commercially available from Shell Oil Co.
[2]Liquid diepoxide commercially available from Union Carbide.
[3]Fluoroaliphatic polymeric ester surfactant commercially available from 3M Co.
[4]Triaryl sulfonium salt-based initiator commercially available from Union Carbide.
[5]Photosensitizer commercially available from Aldrich Chemical Co.
[6]Commercially available from Idemitsu Petrochemicals Co. Ltd.

Methyl ethyl ketone was added to adjust the total solids content of the size coat to 25% by weight, after which the resulting size coat was applied on top of the color coat using a #5 mayer rod.

The coated surface of the film was then placed in intimate contact with the surface of a molded semiconductor device. Next, a $CO_2$ laser was directed through the uncoated side of the carrier film to transfer the ink (color coat plus size coat) to the surface of the semiconductor device. The laser dwelled on each addressed pixel for 20 μsec. The power output of the laser at the point of contact with the coated film was 14.5 W. The device bearing the transferred image was then cured (5 min. at a 150° C. preheat, followed by a 3.6 sec exposure to UV radiation). The resulting cured printed image was found to be resistant to treatment with 1,1,1-trichloroethane (3 min. soak, 10 brush strokes, cycled 3 times).

EXAMPLE 3

This example describes the preparation of a transfer medium having a two-pass, cationically curable ink in which the color coat is non-curable and the size coat is thermally or photochemically curable.

The following ingredients were combined to form a non-curable color coat (all amounts in weight percent):

| Water | 54.0 |
|---|---|
| Daxad 30[1] | 0.5 |
| TiO_2 | 38.4 |
| Triton X-100[2] | 0.5 |
| Shamrock 375[3] | 6.2 |
| Rhoplex B85[4] | 1.4 |
| Amsco 3011[5] | 7.7 |

[1]Polyacrylate dispersing agent commercially available from W. R. Grace.
[2]Surfactant commercially available from Rohm & Haas.
[3]Polyethylene wax dispersion commercially available from Diamond Shamrock.
[4]Acrylic dispersion commercially available from Rohm & Haas.
[5]Acrylic dispersion commercially available from Rohm & Haas.

Enough ammonium hydroxide was added to adjust the pH to 8.5, after which the resulting color coat was applied to a 1.2 mil thick polypropylene carrier film at a coat weight of 69 mg/m².

The following ingredients were combined to form a photochemically curable size coat (all amounts in weight percent):

| EPON 1001[1] | 88.2 |
|---|---|
| UVR 6110[2] | 11.6 |
| FC-430[3] | 3.0 |
| UV 479[4] | 1.6 |
| IR 99[5] | 0.5 |
| Benzpinacole[6] | 0.47 |

[1]Bisphenol A diglycidyl ether commercially available from Shell Oil Co.
[2]Liquid diepoxide commercially available from Union Carbide.
[3]Fluoroaliphatic polymeric ester surfactant commercially available from 3M Co.
[4]Iodonium salt thermal initiator commercially available from General Electric.
[5]Dye commercially available from Glendale Protective Technologies.
[6]Accelerator commercially available from Aldrich Chemical Co.

Methyl ethyl ketone was added to adjust the total solids content of the size coat to 25% by weight, after which the resulting size coat was applied on top of the color coat using a #5 mayer rod.

The coated surface of the film was then placed in intimate contact with the surface of a molded semiconductor device. Next, a Nd:YAG laser was directed through the uncoated side of the carrier film to transfer the ink (color coat plus size coat) to the surface of the semiconductor device. The laser dwelled on each addressed pixel for 18 μsec. The power output of the laser at the point of contact with the coated film was 4.5 W. The device bearing the transferred image was then cured (4 min. at 175° C.). The resulting cured printed image was found to be resistant to treatment with 1,1,1-trichloroethane (3 min. soak, 10 brush strokes, cycled 3 times).

EXAMPLE 4

This example describes the preparation of a transfer medium having a one-pass, thermally curable, cationically initiated ink in which transfer and cure takes place in a single step upon laser irradiation.

The following ingredients were combined to form a laser-transferrable ink (all amounts in weight percent):

| Talc[1] | 30.0 |
|---|---|
| UVE 9310[2] | 7.0 |
| Copper benzoate[3] | 0.14 |
| Epon 164[4] | 51.43 |
| CHVE5[5] | 11.43 |

[1]Nytal 400 commercially available from R. T. Vanderbilt.
[2]Photo and thermal initiator commercially available from General Electric.
[3]Accelerator commercially available from Aldrich Chemical Co.
[4]Epoxy novolac resin having an epoxy equivalent of 200–240 commercially available from Shell Oil.
[5]Cyclohexyl divinyl ether commercially available from GAF or ISI Products.

Methyl ethyl ketone was added to adjust the total solids content to 50% by weight, after which the resulting ink was coated onto a 1.2 mil thick polypropylene carrier film using a #10 mayer rod. The coated surface of the film was then placed in intimate contact with a glass slide. Next, a $CO_2$ laser was directed through the uncoated side of the carrier film to transfer the ink to the surface of the glass slide. The laser dwelled on each addressed pixel for 80 μsec. After addressing, the transferred coating was removed form the glass slide and analyzed by differential scanning calorimetry. There was no evidence of residual heat of reaction, indicating that the transferred coating had cured during the transfer step.

EXAMPLE 5

This example describes the preparation of a transfer medium having a two-pass, free radical-initiated ink in which both the color coat and the size coat are photochemically curable.

The following ingredients were combined to form a photochemically curable color coat (all amounts in weight percent):

| | |
|---|---|
| $TiO_2$ | 65.0 |
| Aquacer 355[1] | 11.0 |
| NR 440[2] | 18.8 |
| PPZ[3] | 3.0 |
| Triton X-100[4] | 0.2 |
| Daracure 4265[5] | 2.0 |

[1]Polyethylene wax dispersion commercially available from Diamond Shamrock.
[2]Acrylate-functionalized prepolymer commercially available from Zeneca Resins.
[3]Commercially available from Idemitsu Petrochemicals Co. Ltd.
[4]Surfactant commercially available from Rohm & Haas.
[5]Photochemical free radical initiator commercially available from Ciba Geigy.

Water was added to adjust the total solids content to 40% by weight, after which the resulting color coat was applied to a 1.2 mil thick polypropylene carrier film using a #13 mayer rod.

The following ingredients were combined to form a photochemically curable size coat (all amounts in weight percent):

| | |
|---|---|
| NR 440[1] | 78.0 |
| Ebecryl 639[2] | 20.0 |
| Daracure 4265[3] | 2.0 |

[1]Acrylate-functionalized prepolymer commercially available from Zeneca Resins.
[2]Acrylate-functionalized prepolymer commercially available from Radcure.
[3]Photochemical free radical initiator commercially available from Ciba Geigy.

Water was added to adjust the total solids content of the size coat to 40% by weight, after which the resulting size coat was applied on top of the color coat using a #5 mayer rod.

The coated surface of the film was then placed in intimate contact with the surface of a molded semiconductor device. Next, a $CO_2$ laser was directed through the uncoated side of the carrier film to transfer the ink (color coat plus size coat) to the surface of the semiconductor device. The laser dwelled on each addressed pixel for 20 μsec. The power output of the laser at the point of contact with the coated film was 14.5 W. The device bearing the transferred image was then cured (5 min. at a 100° C preheat, followed by passage through a UV fusion oven equipped with an H bulb at a speed of 100 in./min.). The resulting cured printed image was found to be resistant to treatment with 1,1,1-trichloroethane (3 min. soak, 10 brush strokes, cycled 3 times).

EXAMPLE 6

This example describes the preparation of three different transfer media having a two-pass ink in which the color coat is non-curable and the size coat is thermally or photochemically curable.

White, red and blue transfer media were each made by coating a pigment layer of the following compositions over 0.9 mil a polypropylene carrier film using the coating methods described in Examples 1–5.

The following ingredients were combined to form a white, non-curable color coat (all amounts in weight percent):

| | |
|---|---|
| $TiO_2$ | 69.0 |
| Daxad 30[1] | 0.9 |
| Triton X-100[2] | 0.9 |
| Shamrock S-372[3] | 11.1 |
| Rhoplex B85[4] | 2.9 |
| Amsco 3011[5] | 15.2 |

[1]Polyacrylate dispersing agent commercially available from W. R. Grace.
[2]Surfactant commercially available from Rohm & Haas.
[3]Polyethylene wax dispersion commercially available from Diamond Shamrock.
[4]Acrylic dispersion commercially available from Rohm & Haas.

The final dry coat weight was 8.1–8.7 $g/m^2$.

The following ingredients were combined to form a red, non-curable color coat (all amounts in weight percent):

| | |
|---|---|
| Seikafast Red | 5.5 |
| Dianell Orange | 12.8 |
| Graphthol Black | 0.02 |
| Daxad 30[1] | 2.3 |
| Triton X-100[2] | 1.7 |
| Shamrock S-372[3] | 49.7 |
| Rhoplex B85[4] | 2.3 |
| Amsco 3011[5] | 11.7 |
| Multiflex MM[6] | 11.7 |
| Igepal CG-630[7] | 1.2 |
| Surfynol TG[8] | 0.9 |

[1]Polyacrylate dispersing agent commercially available from W. R. Grace.
[2]Surfactant commercially available from Rohm & Haas.
[3]Polyethylene wax dispersion commercially available from Diamond Shamrock.
[4]Acrylic dispersion commercially available from Rohm & Haas.
[5]Acrylic dispersion commercially available from Rohm & Haas.
[6]RD-02 commercially available from Pfizer.
[7]Commercially available from Rhone-Poulenc.
[8]Commercially available from Air Products.

The final dry coat weight was 5.5–6.1 $g/m^2$.

The following ingredients were combined to form a blue, non-curable color coat (all amounts in weight percent):

| | |
|---|---|
| Ultramarine Blue[1] | 76.7 |
| Superchlor NS-5[2] | 3.4 |
| VMCH[3] | 1.7 |
| Ross Wax 244-B[4] | 10.2 |
| Carbowax 3350[5] | 7.9 |

[1]Dye RC-26 commercially available from Whittaker, Clark and Daniels, Inc.
[2]Chlorinated rubber commercially available from Chemcentral.
[3]RB-14 commercially available from Union Carbide.
[4]RB-25 commercially available from Ross, Inc.
[5]RE-20 commercially available from Union Carbide.

The final dry coat weight was 6.9–7.4 $g/m^2$.

Each of these color coats were overcoated with a curable size coat using the methods described in Examples 2, 3 and 5. The following ingredients were combined to form a thermally and photochemically curable size coat (all amounts in weight percent):

| | |
|---|---|
| Epon 164[1] | 88.2 |
| ERL 4221[2] | 5.8 |
| UV 479[3] | 3.0 |
| FC-430[4] | 3.0 |

-continued

[1] Epoxy novolac resin having an epoxy equivalent of 200–240 commercially available from Shell Oil.
[2] Commercially available from Union Carbide.
[3] Iodonium salt thermal initiator commercially available from General Electric.
[4] Fluoroaliphatic polymeric ester surfactant commercially available from 3M Co.

EXAMPLE 7

This example describes the preparation of a transfer medium having a two-pass ink in which the color coat is metallized coating and the size coat is thermally or photochemically curable.

The transfer medium was made by coating a layer of Ouricury wax (layer too thin to measure) over a 0.5 mil PET (polyester) film base. A second layer consisting of Superchlor NS-5 (chlorinated rubber) was then deposited. The coat weight was 1.05 g/m$^2$. Finally, aluminum was vacuum sublimed over the second layer. The coat weight was 0.1 g/m$^2$. The curable size coat described in Example 6 was then applied over the metallized coating.

EXAMPLE 8

This example describes a method for creating a two-color image via two independent transfer steps which are followed by a final cure step.

Two-color images were produced by first imaging one color using one of the transfer media described in Example 6 or Example 7, and a Nd:YAG laser in the format described, e.g., in Example 3. A second transfer medium of a different color from the group described in Examples 6 or 7 was then placed over the same surface and addressed in registration with the area covered by the first transfer medium, again with the Nd:YAG laser. The substrate can be, for example, a molded semiconductor device. Pixels imaged in the second laser step were from the pixel set which had not been addressed in the first laser imaging step. The two-color image thus obtained was then cured by heat at 150° C. for 60 min.

The transfer media used in this Example may also be cured photochemically. The metallized transfer media can be cured thermally, because the aluminum layer blocks the light, preventing the light from reaching the size coat. This method can be used to make other multicolor images with more than two colors.

Other embodiments are within the following claims.

What is claimed is:

1. A transfer printing medium comprising a carrier to which is applied a curable laser-transferrable ink having one or more layers, said ink comprising
   (a) a colorant;
   (b) a polymerization initiator; and
   (c) a curable prepolymer,
   said transfer medium being capable of converting laser energy to heat,
   wherein said ink transfers to a surface of interest and cures in one step upon application of laser energy.

2. The transfer printing medium of claim 1 wherein said polymerization initiator comprises a thermal polymerization initiator and said prepolymer is thermally curable.

3. The transfer printing medium of claim 1 wherein said prepolymer comprises an epoxy-functionalized prepolymer.

4. The transfer printing medium of claim 1 wherein said prepolymer further comprises a vinyl ether-functionalized prepolymer.

5. The transfer printing medium of claim 1 wherein said prepolymer comprises an acrylate-functionalized prepolymer.

6. The transfer printing medium of claim 1 wherein said prepolymer comprises a blocked isocyanate-functionalized prepolymer.

7. The transfer printing medium of claim 1 wherein said prepolymer comprises a blend of a vinyl ether-functionalized prepolymer and a maleate- or maleimide-functionalized prepolymer.

8. The transfer printing medium of claim 1 wherein a layer of said ink is a curable size coat comprising a polymerization initiator and a curable prepolymer.

9. The transfer printing medium of claim 1 wherein a layer of said ink is a curable size coat comprising a polymerization initiator and a curable prepolymer and a layer of said ink is a non-curable color coat comprising a colorant and a thermoplastic film-forming resin.

10. The transfer printing medium of claim 1 wherein a layer of said ink is a curable size coat comprising a polymerization initiator and a curable prepolymer and a layer of said ink is a curable color coat comprising a colorant, a polymerization initiator, and a curable prepolymer.

11. The transfer printing medium of claim 1 wherein a layer of said ink comprises a metallized film.

12. A laser-induced transfer printing method comprising the steps of
   (a) providing a transfer printing medium capable of converting laser energy to heat comprising a carrier to which is applied a curable laser-transferrable ink; and
   (b) irradiating said medium with laser light of a predetermined wavelength,
   whereupon said laser light transfers said ink to a surface of interest and cures said ink to adhere said ink to the surface of interest.

13. The method of claim 12 wherein a layer of said ink is a curable size coat comprising said curable prepolymer and a layer of said ink is a non-curable color coat comprising said colorant and a thermoplastic film-forming resin.

14. The method of claim 12 wherein a layer of said ink is a curable size coat comprising said curable prepolymer and a layer of said ink is a curable color coat comprising said colorant and said curable prepolymer or a different curable prepolymer.

15. The method of claim 12 wherein a layer of said ink comprises a metallized film.

16. A laser-induced transfer printing method comprising the steps of
   (a) providing a first transfer printing medium capable of converting laser energy to heat comprising a carrier to which is applied a first curable laser-transferrable ink having one or more layers, said first ink comprising
      (i) a colorant;
      (ii) a polymerization initiator; and
      (iii) a curable prepolymer;
   (b) irradiating said first transfer printing medium with laser light of a predetermined wavelength to transfer said first ink to a surface to provide a marking on said surface;
   (c) providing a second transfer printing medium capable of converting laser energy to heat comprising a carrier to which is applied a second curable laser-transferrable ink having one or more layers, said second ink comprising
      (i) a colorant;
      (ii) a polymerization initiator; and (iii) a curable prepolymer;

(d) irradiating said second transfer printing medium with laser light of a predetermined wavelength to transfer said second ink to a surface to provide a marking on said surface, said first marking and second marking together providing a desired image on said surface; and (e) curing said the prepolymers in said inks to adhere said inks to the surface of interest.

17. The method of claim 16 wherein said polymerization initiators comprise thermal polymerization initiators and said prepolymers are thermally curable.

18. The method of claim 16 wherein said polymerization initiators comprise photoinitiators and said prepolymers are photochemically curable.

19. The method of claim 16 wherein a layer of one of said inks is a curable size coat comprising a polymerization initiator and a curable prepolymer and a layer of one of said inks is a non-curable color coat comprising a colorant and a thermoplastic film-forming resin.

20. The method of claim 16 wherein a layer of one of said inks is a curable size coat comprising a polymerization initiator and a curable prepolymer and a layer of one of said inks is a curable color coat comprising a colorant, a polymerization initiator, and a curable prepolymer.

21. The method of claim 16 wherein a layer of one of said inks comprises a metallized film.

* * * * *